United States Patent
Roshan et al.

(10) Patent No.: US 7,686,493 B2
(45) Date of Patent: Mar. 30, 2010

(54) DISPLAY

(75) Inventors: Rakesh Roshan, Greater Leys (GB); Peter Neil Taylor, Littlemore (GB); David James Montgomery, Bampton (GB)

(73) Assignee: Sharp Kabushiki Kaisha, Osaka (JP)

( * ) Notice: Subject to any disclaimer, the term of this patent is extended or adjusted under 35 U.S.C. 154(b) by 155 days.

(21) Appl. No.: 11/865,110

(22) Filed: Oct. 1, 2007

(65) Prior Publication Data

US 2008/0084706 A1    Apr. 10, 2008

(30) Foreign Application Priority Data

Oct. 4, 2006   (GB)   ................... 0619587.9

(51) Int. Cl.
  *F21V 7/04*   (2006.01)
  *H01J 1/62*   (2006.01)
  *G02F 1/1335*   (2006.01)

(52) U.S. Cl. .................. 362/607; 362/84; 313/504; 349/71

(58) Field of Classification Search ............. 362/601, 362/606, 607, 612, 613, 97.1–97.4; 349/64, 349/69, 71, 104; 313/503; 427/64
See application file for complete search history.

(56) References Cited

U.S. PATENT DOCUMENTS

| | | | |
|---|---|---|---|
| 4,793,691 A * | 12/1988 | Enomoto et al. | 349/71 |
| 5,813,753 A * | 9/1998 | Vriens et al. | 362/293 |
| 5,998,925 A * | 12/1999 | Shimizu et al. | 313/503 |
| 6,608,614 B1 * | 8/2003 | Johnson | 345/102 |
| 6,637,905 B1 | 10/2003 | Ng et al. | |
| 6,768,525 B2 * | 7/2004 | Paolini et al. | 349/65 |
| 6,809,781 B2 | 10/2004 | Setlur et al. | |
| 2004/0056990 A1 | 3/2004 | Setlur et al. | |
| 2004/0105481 A1 * | 6/2004 | Ishida et al. | 372/108 |

(Continued)

FOREIGN PATENT DOCUMENTS

EP   1 403 689   3/2004

(Continued)

OTHER PUBLICATIONS

European Search Report for corresponding application No. EP 07117819 completed Nov. 17, 2008.

(Continued)

*Primary Examiner*—Ali Alavi
(74) *Attorney, Agent, or Firm*—Renner, Otto, Boisselle & Sklar, LLP

(57) ABSTRACT

A display comprises a light source and an image display panel disposed in an optical path from the light source. The light source comprises a primary light source for illuminating a re-emission material which comprises at least a first nanophosphor material for, when illuminated by light from the primary light source, re-emitting light in a first wavelength range different from the emission wavelength range of the primary light source. The image display panel comprises a first filter having a first narrow passband or a first narrow absorption band, the first narrow passband or first narrow absorption band being aligned or substantially aligned with the first wavelength range. The combination of a narrow wavelength range emitted by the first nanophosphor material and the narrow passband or narrow absorption band of the filter allows a display with high efficiency and a high NTSC ratio to be obtained.

31 Claims, 12 Drawing Sheets

U.S. PATENT DOCUMENTS

| | | | |
|---|---|---|---|
| 2004/0207313 A1* | 10/2004 | Omoto et al. | 313/503 |
| 2006/0002678 A1 | 1/2006 | Weber et al. | |
| 2006/0109682 A1 | 5/2006 | Ko et al. | |
| 2008/0106186 A1 | 5/2008 | Ishii et al. | |

FOREIGN PATENT DOCUMENTS

| | | |
|---|---|---|
| GB | 2 425 393 | 10/2006 |

OTHER PUBLICATIONS

Jong Kyu Kim et al.; "Strongly Enhanced Phosphor Efficiency in GaInN White Light-Emitting Diodes Using Remote Phosphor Configuration and Diffuse Reflector Cup"; Japanese Journal of Applied Physics, vol. 44, No. 21, 2005; pp. L649-L651.

* cited by examiner

DISPLAY

This Nonprovisional application claims priority under 35 U.S.C. §119(a) on Patent Application No. 0619587.9 filed in U.K. on Oct. 4, 2006, the entire contents of which are hereby incorporated by reference.

FIELD OF THE INVENTION

The present invention relates to a display, for example such as Liquid Crystal Display (LCD), and in particular to a display using a backlight. Such displays are used in, for example, mobile phones, televisions, computer monitors etc.

BACKGROUND OF THE INVENTION

Many displays incorporate a transmissive display panel and a backlight for illuminating the display panel. FIG. 1(a) is a block schematic view of such a display 1. The display 1 comprises a transmissive display panel 2, for example a transmissive liquid crystal display panel, a light source 4 and a light guide 5. The light source 4 and the light guide 5 together comprise a backlight 3. In use, the display panel 2 is illuminated by the backlight 3 such that an image displayed on the display panel 2 is visible to an observer located on the opposite side of the display panel to the backlight 3. Light from the backlight is designed to pass though elements of an LCD display panel such as polarising filters, TFT layers, liquid crystals film, colour filters etc. finally reaching the observer. Such a display is described in more detail in, for example "Liquid Crystal Flat Panel Displays" by William O'Mara (1993).

Transflective displays are also known. These have a structure generally similar to the display of FIG. 1 but incorporate a partially-reflecting layer disposed behind the image display layer of the display panel 2. (By "behind" the image display layer is meant that the partially-reflecting layer is on the opposite side of the image display layer to the observer.) The display panel 2 may be illuminated by the backlight 3 in low ambient lighting conditions or by reflected ambient light in bright ambient lighting conditions.

Front-light displays are also known, which incorporate a reflective layer disposed behind the image display layer of a display panel. The display panel may be illuminated by a frontlight in low ambient lighting conditions or by reflected ambient light in bright ambient lighting conditions.

Where an image display layer of a display is illuminated by a backlight, it is important that the backlight provides a bright image, so that the image is visible to an observer in any ambient lighting conditions. It is important that the backlight provides a high colour gamut, so that a full-colour image is correctly reproduced.

FIG. 1(b) shows the CIE 1931 colour space chromaticity diagram. The enclosed area 16 in this diagram represents all wavelengths visible to a human (the "gamut of human vision"). The outer curved portion 15 is the spectral (monochromatic) locus, with the numbers indicating wavelengths shown in nanometers. A light source may be represented by a point in the colour space, with a truly monochromatic light source being represented by a point on the spectral locus.

A backlight may consist of three light sources of different emission wavelengths, for example light sources that emit in the red, green and blue regions of the spectrum. All colours that may be formed using three light sources are represented by the interior of the triangle defined on the CIE chromaticity diagram by the three points corresponding to the sources. FIG. 1(b) shows a triangle 17 corresponding to the colour space defined by the US National Television System Committee.

In assessing the colour gamut of a backlight for a display, one measure is the "NTSC ratio". This may be defined as:

$$\frac{\text{Area of colour space of backlight on CIE diagram}}{\text{Area of NTSC colour space on CIE diagram}} = NTSC \text{ ratio}$$

Recently manufacturers of Liquid Crystals Display manufacturers have increasingly been using LEDs (light-emitting diodes) as light sources in backlights for displays in mobile phones, PC monitors and televisions. LEDs potentially have several advantages over conventional light sources, such as long lifetime and high efficiency.

White light can be produced using LEDs by mixing red, blue and green light from an array of separate blue, red and green LEDs as disclosed in, for example, U.S. Pat. No. 6,608,614 and U.S. Pat. No. 6,768,525. A high NTSC ratio can be achieved using individual, epitaxially grown, blue, red and green LEDs. However, this method is expensive and has potential problems with colour mixing and complexity of the required electronics circuitry for driving the LEDs. A further problem is that the relative degradation of the three coloured LEDs may be different, leading to colour shifts during extended operation. Yet another problem is that fabricating efficient green LEDs still remains a challenge. Nevertheless, this approach provides the highest values so far reported for the NTSC ratio.

An alternative approach is to use an monochromatic LED as a primary light source to illuminate a medium, such as a phosphor, that converts all or part of the light from the LED to light of another wavelength so that a white light output is obtained. For example, use of an blue LED to illuminate a yellow phosphor leads to part of the output light from the LED being absorbed and re-emitted by the phosphor in the yellow region of the spectrum, to produce a white light. (The term "blue LED", for example, as used herein refers to an LED that emits light in the blue region of the spectrum; similarly, the term "yellow phosphor", for example, as used herein refers to a phosphor that, when illuminated by a light of a suitable wavelength, re-emits light in the yellow region of the spectrum.)

Japanese Journal of Applied Physics, Vol. 44, No. 21, pp. L 649-L 651 (2005) reports a phosphor-converted white LED (WLED). A WLED consists of a primary blue or ultra-violet (UV) LED illuminating a white, yellow or red/green fluorescent phosphor layer which down-converts all or part of the primary blue/UV excitation light to emit white light.

One disadvantage of this method, when applied to a backlight for a display device, is that phosphor converted LEDs generally have a broad emission peak, as shown in the left hand part of FIG. 2(a). When used as a backlight for a display having conventional colour filters with the typical absorption characteristics shown in the central part of FIG. 2(a), an NTSC ratio of only around 65% is possible.

The emission spectrum of FIG. 2(a) is for YAG-based phosphor materials. Several YAG-based fluorescent materials have been used as phosphors for phosphor-converted LEDs. Example of these materials are disclosed in U.S. Pat. No. 5,813,753 and U.S. Pat. No. 5,998,925.

A higher NTSC ratio of 104.2% can be achieved, when using conventional phosphor WLEDs, by using narrow-band colour filters in the display panel. This is illustrated in FIG. 2(b), in which the left hand figure shows the emission spectrum of the phosphors (which is generally similar to the phosphor emission spectrum of FIG. 2(a)), and the central figure shows the characteristics of the colour filters of the liquid crystal panel. However, modelling results show that the overall brightness is greatly reduced by the use of narrow-band colour filters in the display panel—compared to FIG. 2(a), the efficiency (defined as the % of light output from the backlight that is not absorbed within the display panel) is reduced by 30%. In order to compensate for this reduction in efficiency the backlight must be driven to give a greater output power, and this will shorten the lifetime of the backlight and increase power consumption.

U.S. Pat. No. 6,809,781 and US 2004/0056990 describe using selection of conventional phosphor blends in a transparent matrix, which emit strongly in the wavelength range specific to the LCD colour filters in order to enhance the brightness of the LCD.

U.S. Pat. No. 6,637,905 describes a backlight using such conventional phosphors in which phosphors are placed remotely and irradiated by a primary source. The heating in the phosphors is largely by the remote location of the phosphors; hence this maintains a uniform emission from the device over a longer period of time. These types of WLEDs attain a quasi-white emission but lack strong contributions in the red region of the spectrum.

US 2004/0207313 describes white LEDs in which white light is generated from various combinations of green phosphors, red phosphors, blue LEDs and red LEDs. In this invention the red LEDs compensate the lack of red light and thus a better colour characteristic is attained.

GB 2 425 393, published after the priority date of this application, relates to a display panel which can display both a "primary image" and a "secondary image" such as a company logo. A region of wavelength converting material is provided in the display panel, and the display panel is illuminated by an array of light sources that includes first light sources for providing the primary image and second light sources for illuminating the wavelength conversion material. The secondary image may be projected through a filter layer which blocks the light that is used to excite the wavelength converting material.

SUMMARY OF THE INVENTION

The present invention provides a display comprising: a light source and an image display panel disposed in an optical path from the light source; wherein the light source comprises a primary light source for emitting light in a primary wavelength range and a re-emission material for, when illuminated by light from the primary light source, re-emitting light in a wavelength range different from the primary wavelength range; wherein the re-emission material comprises at least a first nanophosphor material for, when illuminated by light from the primary light source, re-emitting light in a first wavelength range different from the primary wavelength range; and wherein the image display panel comprises a first filter having a first narrow passband or a first narrow absorption band, the first narrow passband or first narrow absorption band being substantially aligned with the first wavelength range.

A nanophosphor is a nanoparticle that exhibits the property of fluorescence. A fluorescent material is a material that, when illuminated by electromagnetic radiation, re-emits electromagnetic radiation at a lower frequency (i.e., at a lower photon energy) than the frequency of the illuminating radiation. A nanophosphor may, for example, contain one or more of: colloidal quantum dots, nanorods, nanoneedles, nanospindles, fullerenes, nanowires and dendrimers.

A nanoparticle typically has a size in the range of from 1 nm to 200 nm. On this scale, the energy levels of a nanoparticle are discrete, as for the energy levels of an atom. In the case of colloidal quantum dots, as an example, the diameter of the quantum dots is typically from 2 to 10 nm (or 10 to 50 atoms in diameter).

By "aligned" is meant that the peak in the emission spectrum of the nanophosphor material is centred, or substantially centred, within the narrow passband, or narrow absorption transmission window, of the colour filter.

By a "narrow passband" or "narrow absorption band" filter is meant that the filter preferably has a passband (or absorption band) with a full width at half maximum transmissivity (FWHM) of 100 nm or below.

Moreover, the filter characteristics are preferably such that 5% or less of the filter transmission/absorption is outside the passband (or absorption band). In the case of, for example, a green pass filter having a passband with a FWHM of 100 nm extending from 480 nm to 580 nm, 95% or more of light passed by the filter is preferably in the wavelength range 480 nm to 580 nm, and 5% or less of light passed by the filter is at wavelengths below 480 nm or above 580 nm.

Use of a nanophosphor material as a re-emission source provides two advantages. Firstly, the emission spectrum of a nanophosphor material is narrow, typically with a full width at half maximum intensity (FWHM) of 80 nm or less. Secondly, the peak wavelength (and also the line-width) of the emission spectrum of a nanophosphor material can be chosen to be any desired value, by use of a suitable nanophosphor material (for example by controlling the size of the quantum dots, or the size distribution of the quantum dots, in the nanophosphor material). Accordingly, by making the emission spectrum of a nanophosphor material of the backlight such that the peak in the emission spectrum is centred, or substantially centred, within the transmission window of a respective colour filter (preferably a narrow passband colour filter), in the image display panel, it is possible to obtain a display that has a high NTSC ratio and a high brightness. FIGS. 2(c), 2(d) and 2(e) indicate that an NTSC ratio of over 110% may be obtained, without significant loss of efficiency.

To obtain a RGB display, the light source may be provided with red, green and blue nanophosphors that are illuminated by the primary light source, and the image display panel may have narrow passband red filters, narrow passband green filters, and narrow passband blue filters. Such a display is illustrated in FIG. 2(d), in which the left hand view shows the emission spectrum of the nanophosphors, and the central view shows the transmissivity of the colour filters of the liquid crystal panel. It can be seen that the emission spectrum is composed substantially of narrow red, green and blue emission peaks, and that the emission peaks in the spectrum of the nanophosphors in the left hand view of FIG. 2(d) are much narrower than the emission peaks in the spectrum of the conventional phosphors shown in the left hand view of FIG. 2(a); also, the intensity of emission in the green part of the spectrum is much higher for the nanophosphors. It can also be seen that each emission peak in the spectrum of the nanophosphors in the left hand view of FIG. 2(d) is substantially centred in the transmission window shown in the central view of FIG. 2(d) for the respective filter, and this leads to both a high NTSC ratio and a high efficiency.

The narrow passband filters in FIG. 2(d) preferably have a full width at half maximum transmissivity (FWHM) of 100 nm or below. (It is not necessary for each filter to have the same value of FWHM.)

The invention does not however require that the light source is provided with red, green and blue nanophosphors, and a blend of nanophosphors and conventional phosphors may be used. In particular, it will be noted that the emission spectrum shown in the left hand view of FIG. 2(a) has a low intensity in the green and red regions of the spectrum. The invention may therefore be effected using a re-emission medium comprising mixture of one or more nanophosphor materials and one or more conventional phosphors, as illustrated in FIG. 2(c). For example, a mixture of a green nanophosphor material and conventional red and blue phosphors may be used. The left hand view of FIG. 2(c) shows the resultant emission spectrum, and it can be seen that the use of a green nanophosphor material has significantly improved the emission intensity in the green region of the spectrum. When this re-emission medium is used in combination with an image display panel having narrow passband red filters, narrow passband green filters, and narrow passband blue filters, with each peak in the emission spectrum being centred, or substantially centred, within the transmission window of the respective colour filter as indicated in the central view of FIG. 2(c), a high NTSC ratio and a high efficiency are again obtained. (It will be seen that the efficiency is lower than for figure 2(d), and this is because the emission spectrum in the left hand view of FIG. 2(c) has a significant intensity at around 575 nm, which is blocked by the filters.)

Moreover, the invention does not require that the image display panel is provided with narrow passband red filters, narrow passband green filters, and narrow passband blue filters. In prior displays a low NTSC ratio usually arises because the green point of the display is well away from the curved boundary (spectral locus) of the CIE diagram. A considerable improvement can therefore be obtained by use of an image display panel provided with narrow passband green filters and conventional wideband red filters and blue filters. This is illustrated in FIG. 2(e), in which the central view shows the overall transmissivity obtained by use of narrow passband green filters and conventional wideband red filters and blue filters. When this image display panel is illuminated by a light source having a re-emission medium containing with red, green and blue nanophosphors to give the re-emission spectrum shown in the left hand view of FIG. 2(e), with each peak in the emission spectrum being centred, or substantially centred, within the transmission window of a respective colour filter a high NTSC ratio and a high efficiency are again obtained.

It will be seen that the NTSC ratio of FIG. 2(e) is slightly lower than for FIGS. 2(c) and 2(d), and this is because the emission spectrum in the left hand view of FIG. 2(e) has a significant intensity in the wavelength range 500-525 nm, where both the blue filter and the green filter have non-zero transmissivity. To obtain the highest value of efficiency and the NTSC ratio, the emission spectrum of the re-emission material is preferably chosen to minimise the emission intensity in overlap regions in the filter transmissivities (that is, at wavelengths at which two filters have significant non-zero transmissivities).

In the embodiments described with reference to FIGS. 2(c) to 2(e), the re-emission material is provided with nanophosphor materials or conventional phosphor materials that emit in the red, green and blue spectral regions so that a white light output may be obtained. Light from the primary light source is not required to contribute to the overall light output, and the primary light source may emit light outside the visible spectrum, for example ultra-violet light. In alternative embodiments, however, the overall light output may include some light from the primary light source that has not been absorbed by the re-emission material. For example the primary light source may emit blue light, and the re-emission material may provided with nanophosphor materials or conventional phosphor materials that emit in the red and green spectral regions—so that the overall light output contains red light and green light from the re-emission material and blue light from the primary light source.

The re-emission material may comprise a second nanophosphor material for, when illuminated by light from the primary light source, re-emitting light in a second wavelength range different from the primary wavelength range and different from the first wavelength range.

The image display panel may comprise a second filter having a second narrow passband or a second narrow absorption band, the second narrow passband or second narrow absorption band being aligned or substantially aligned with the second wavelength range.

Again, it is preferred that the second filter has a passband (or absorption band) with a full width at half maximum transmissivity (FWHM) of 100 nm or below. It is not necessary for the second filter to have the same value of FWHM as the first filter, although it may do so.

The re-emission material may comprise a third nanophosphor material for, when illuminated by light from the primary light source, re-emitting light in a third wavelength range different from the primary wavelength range, different from the first wavelength range and different from the second wavelength range.

The image display panel may comprise a third filter having a third narrow passband or a third narrow absorption band, the third narrow passband or third narrow absorption band being aligned or substantially aligned with the third wavelength range.

Again, it is preferred that the third filter has a passband (or absorption band) with a full width at half maximum transmissivity (FWHM) of 100 nm or below. It is not necessary for the third filter to have the same value of FWHM as the first and/or second filter, although it may do so.

The image display panel may comprise a third filter having a third narrow passband or a third narrow absorption band, the third narrow passband or third narrow absorption band covering a third wavelength range, the third wavelength range being different from the first wavelength range and different from the second wavelength range.

Alternatively, the image display panel may comprise a second filter and a third filter, the second filter having a second narrow passband or a second narrow absorption band, the second narrow passband or second narrow absorption band covering a second wavelength range, the third filter having a third narrow passband or a third narrow absorption band, the third narrow passband or third narrow absorption band covering a third wavelength range; wherein, the second wavelength range is different from the first wavelength range, and wherein the third wavelength range is different from the first wavelength range and different from the second wavelength range.

The first filter may comprise a first narrow absorption band aligned or substantially aligned with the first wavelength range, the second and third wavelength ranges not being aligned with the first narrow absorption band. In this embodiment, the second and third wavelength ranges are transmitted through the first filter.

The second filter may comprise a second narrow absorption band aligned or substantially aligned with the second wavelength range, the first and third wavelength ranges not being aligned with the second narrow absorption band. The third filter may comprise a third narrow absorption band aligned or substantially aligned with the third wavelength range, the first and second wavelength ranges not being aligned with the third narrow absorption band. This allows a cyan-yellow-magenta display to be obtained.

The first wavelength range may be in the green portion of the visible spectrum.

The second wavelength range may be in the blue portion of the visible spectrum.

The third wavelength range may be in the red portion of the visible spectrum.

The primary wavelength range may be within an ultraviolet wavelength range.

Alternatively, the first wavelength range may be in the green portion of the visible spectrum, the second wavelength range may be in the red portion of the visible spectrum, and wherein the primary wavelength range may be in the blue region of the visible spectrum.

The re-emission material may further comprises a fourth nanophosphor material for, when illuminated by light from the primary light source, re-emitting light in a fourth wavelength range, the fourth wavelength range being different from the first wavelength range, different from the second wavelength range, and different from the third wavelength range.

The image display panel may comprise a fourth filter having a fourth narrow passband or a fourth narrow absorption band, the fourth narrow passband or fourth narrow absorption band being aligned or substantially aligned with the fourth wavelength range. The fourth filter may, for example, be a cyan filter.

The display may comprise a waveguide for receiving light from the primary light source.

The or each nanophosphor material may be disposed on a light-emission face of the waveguide. Alternatively the or each nanophosphor material may be disposed within the waveguide.

The light source may comprise a first primary light source and a second primary light source; the first nanophosphor material may be arranged to be illuminated by light from the first primary light source; and the light source may further comprise a second nanophosphor material arranged to be illuminated by light from the second primary light source, for, when illuminated by light from the second primary light source, re-emitting light in a second wavelength range different from the first wavelength range.

The light source further may comprise a third primary light source and a third nanophosphor material arranged to be illuminated by light from the third primary light source, for, when illuminated by light from the third primary light source, re-emitting light in a third wavelength range different from the first wavelength range and different from the second wavelength range.

The display may comprise a controller for driving the primary light sources independently from one another. For example, if one of the primary light sources degrades with time, relative to the other primary light sources, the intensity of that primary light source may be increased to maintain a desired colour balance. Alternatively, the primary light sources may be driven in a time-sequential manner.

The first filter may comprise a fifth nanophosphor material.

The second filter may comprise a sixth nanophosphor material and the third filter may comprise a seventh nanophosphor material.

The passband or absorption band of the or each filter may have a full width at half maximum (FWHM) of 100 nm or less, or of 80 nm or less. (In a display having two or more filters, the filters may have different values of FWHM from one another or they may have the same value of FWHM.)

The or each nanophosphor material may have a full width at half maximum (FWHM) of 80 nm or less, or of 60 nm or less. (In a display having two or more nanophosphor materials, the nanophosphor materials may have different values of FWHM from one another or they may have the same value of FWHM.)

Preferred embodiments of the present invention will now be described by way of illustrative example with reference to the accompanying figures, in which:

DESCRIPTION OF THE EMBODIMENTS

Figure 3:
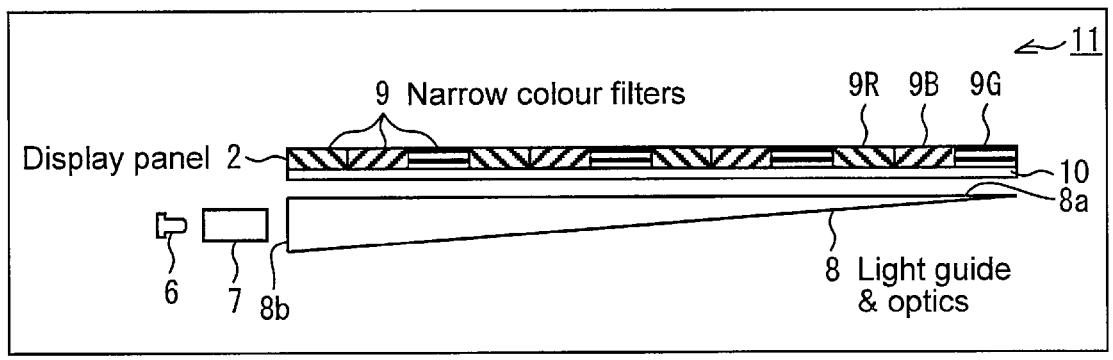
FIG. 3 is a schematic sectional view of a display according to an embodiment of the present invention.

FIG. 3 is a schematic sectional view of a display 11 according to an embodiment of the present invention. The display 11 comprises a light source (described in more detail below), and an image display panel 2 disposed in an optical path from the light source. The display panel 2 comprises an image display layer 10 such as, for example, a liquid crystal layer. Components such as substrates for supporting the image display layer, electrodes and drive circuitry for driving the image display layer, and alignment films for, in the case of a liquid crystal image display layer, aligning the liquid crystal layer have been omitted from FIG. 3 for clarity. In this embodiment the display layer 10 is a pixellated image display layer, in which individual regions ("pixels") of the image display layer may be driven independently of other regions.

The display 11 is intended to provide a colour display, and the display panel 2 is therefore provided with colour filters 9. In the case of a full colour red, green, blue (RGB) display, the image display panel 2 would comprise, as shown in FIG. 3, a set of red colour filters 9R, a set of blue colour filters 9B and a set of green colour filters 9G. Each individual colour filter is aligned with a respective pixel, or sub-pixel, of the image display layer 10.

Apart from the nature of the colour filters 9, which are described in further detail below, the display panel 2 may be any conventional display panel. In general, the present invention may be applied with any suitable image display layer 10.

In the display 11, the light source comprises a primary light source 6 which may be driven to emit light, and a re-emission material 7 provided in the path of light from the primary light source 6. When the primary light source 6 is driven to emit light, light from the primary light source is absorbed by the re-emission material and is re-emitted in a different wavelength range.

FIG. 3 shows the re-emission material 7 separated from the primary light source 6. It is however possible for the re-emission material 7 to be disposed directly on/over the primary light source 6, as shown in, for example, FIG. 5(a) below.

The primary light source 6 may comprise one or more light-emitting diodes (LEDs). The nature of the re-emission material is described in more detail below.

The display 11 further comprises an optical system for ensuring that the image display panel 2 is substantially uniformly illuminated by light from the light source. In the embodiment of FIG. 3, the optical system comprises a waveguide 8 having a light-emission surface 8a that is substantially co-extensive with the image display panel 2. Light from the light source enters the waveguide 8 along one side face 8b, undergoes reflections within the waveguide 8 according to the well-known principle of total internal reflection, and is eventually emitted from the light-emission surface 8a of the waveguide. Waveguides of this general type are known, and the waveguide 8 will not be described in detail.

Figure 1:
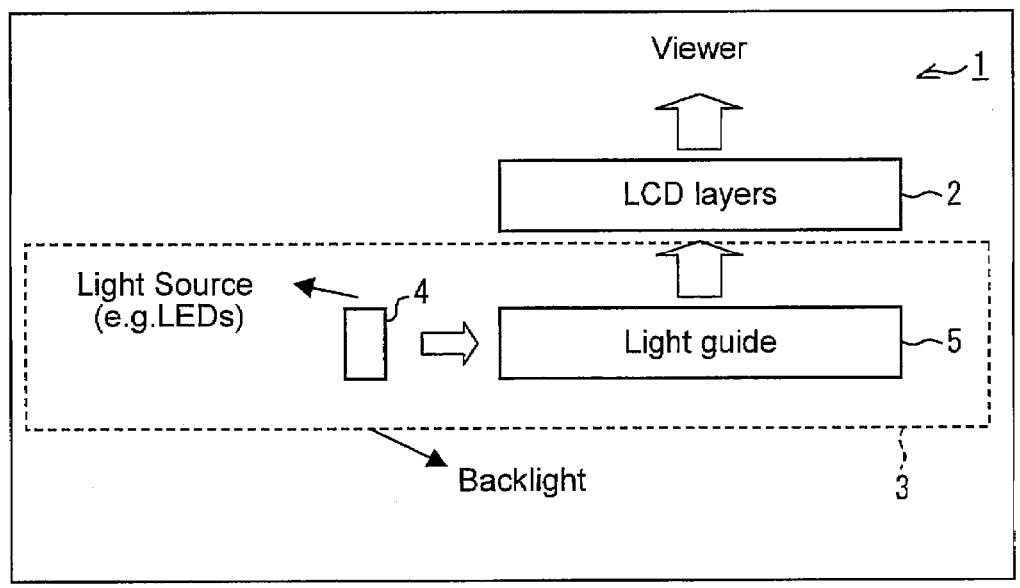
FIG. 1(a) is a schematic view of a conventional display having a transmissive display panel illuminated by a backlight.
FIG. 1(b) shows the CIE chromaticity diagram.
Figure 1:
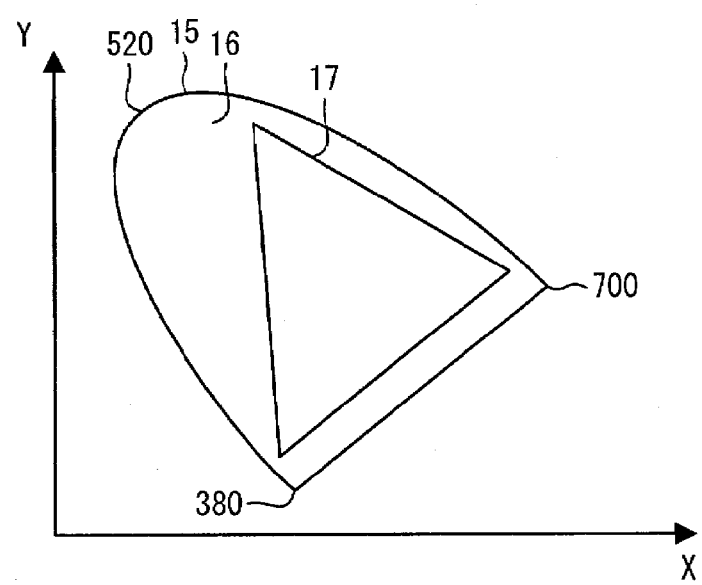

FIG. 3 shows the invention embodied in a display 11 having a transmissive image display panel 2, in which the light source and waveguide 8 together constitute a backlight so that the principle of operation of the display 11 of FIG. 3 corresponds generally to the principle of operation of the display 1 of FIG. 1(a). The invention is not, however, limited to the particular arrangement shown in FIG. 3, and any suitable optical system for distributing light from the light source into the area of the image display panel 2 may be used. Indeed, the invention is not limited to a transmissive display and may, for example, be applied to a transflective display in which ambient light may be utilised to provide an image in bright lighting conditions with the primary light source 6 being driven only in low ambient lighting conditions.

The re-emission material 7 will in general contain two or more different materials that, when illuminated by light from the primary light source 6, emit light in wavelength ranges that are different from one another and that are different from the wavelength range of emission of the primary light source 6. In general, it will be preferable for the light source to provide a white light output and this may be achieved by using a re-emission material 7 containing three different materials that re-emit, respectively, in the red, green and blue regions of the spectrum. This will provide a white light output, and the primary light source 6 may emit light outside the visible spectral region (for example in the ultraviolet (UV) region, since its output is not required to contribute to the overall white light output).

Alternatively, the light output from the light source may include a part of the light output from the primary light source 6 that is not absorbed by the re-emission region 7. In such an example, the re-emission material 7 may for example comprise materials that re-emit in the red and green regions of the spectrum, and the primary light source 6 may emit light in the blue region of the spectrum—so that an overall white light output is obtained by combining the red and green light re-emitted by the components of the re-emission material 7 with the unabsorbed part of the blue light from the primary light source.

According to the present invention, the re-emission material contains at least one nanophosphor material. The emission spectrum of a nanophosphor material is narrow, and preferably has a full width at half maximum density (FWHM) of 80 nm or less and particularly preferably has a FWHM of 60 nm or less.

Furthermore, according to the present invention, at least one set of the colour filters 9 includes colour filters having a narrow pass band. Preferably, the narrow passband filters have a full width at half maximum transmission (FWHM) of 100 nm or below and particularly preferably have a FWHM of 80 nm or below.

As is known, the emission wavelength of a nanophosphor material can be "tuned" to any desired value, for example by controlling the size of the quantum dots in a nanophosphor material that is a colloidal solution of quantum dots. A further feature of the invention is that the emission spectrum of the nanophosphor material is "tuned" such that the emission spectrum of the nanophosphor material is aligned, or substantially aligned, with the transmission window of the corresponding colour filter—so that the peak in the emission spectrum of the nanophosphor material is centred, or substantially centred, within the transmission window of the corresponding colour filter. This is illustrated in FIGS. 4(a) to 4(c).

FIG. 4(a) shows the emission spectrum of the re-emission material 7 for an embodiment in which the re-emission material contains red nanophosphor material, blue nanophosphor material, and green nanophosphor material. The emission spectrum of FIG. 4(a) thus contains three peaks, one in each of the red, green and blue regions of the spectrum. It can be seen that the peaks are narrow, and are much narrower than the emission peaks of conventional phosphors shown in the left hand views of FIG. 2(a) or 2(b).

FIG. 4(b) shows the transmission spectrum of the colour filters 9R, 9B, 9G for an embodiment in which all colour filters are narrow colour filters having a narrow passband. FIG. 4(b) shows the transmissivity of each colour filter plotted against the wavelength. Again, it can be seen that the transmission peaks are much narrower than the transmission peaks of the conventional light colour filters shown in the central view of FIG. 2(a).

It will also be noted that the wavelength at which a colour filter exhibits peak transmission in FIG. 4(b) is substantially equal to the wavelength at which the emission spectrum of FIG. 4(a) has a corresponding maximum. That is, the colour filter is "aligned" with the colour filter.

Figure 2:
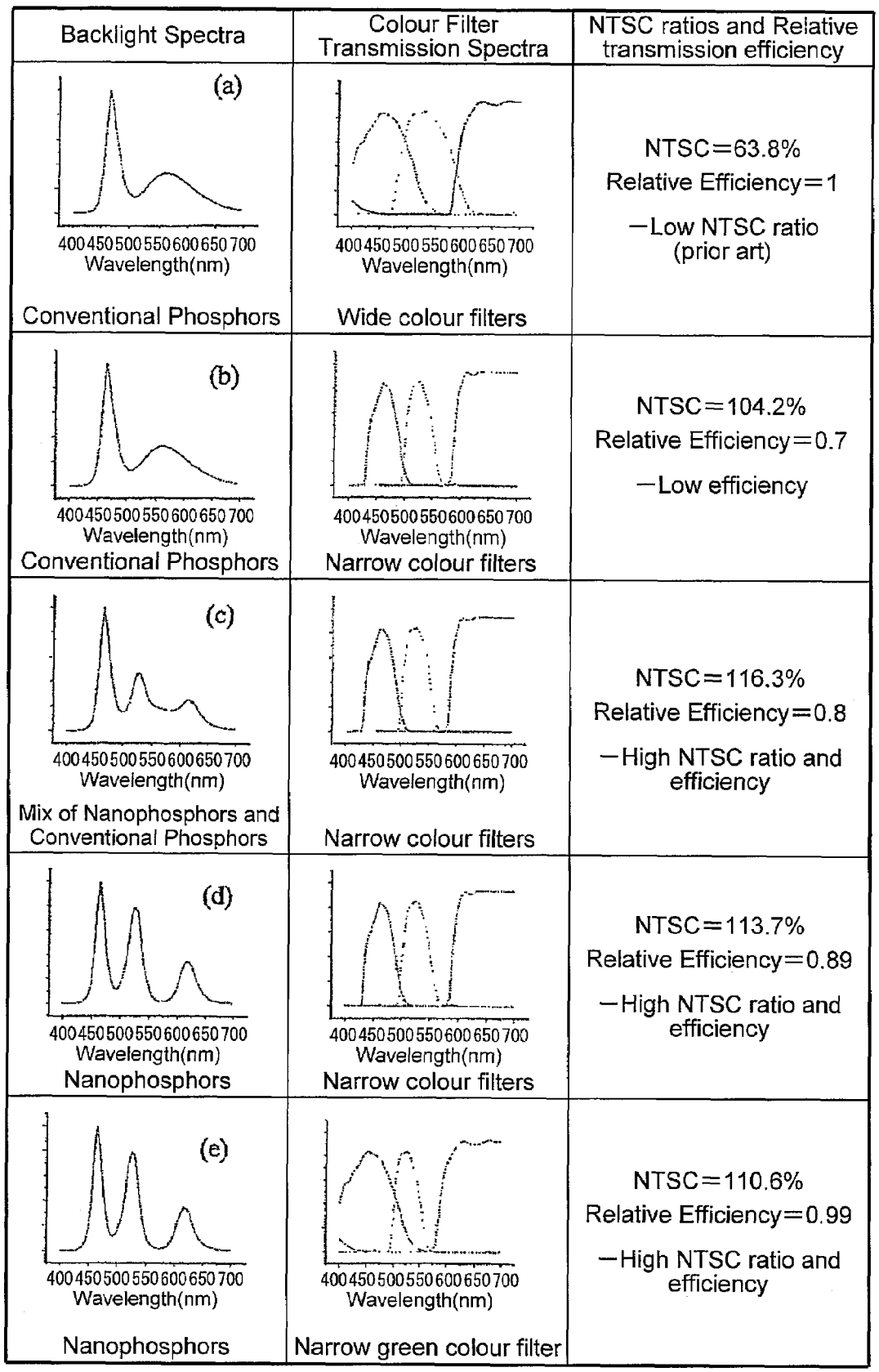
FIGS. 2(a) and 2(b) show the backlight spectra, colour filter transmission spectra, NTSC ratio and relative transmission efficiency for comparative displays.
FIGS. 2(c), 2(d) and 2(e) show backlight spectra, colour filter transmission spectra, NTSC ratios and relative transmission efficiency for displays according to various embodiments of the present invention.

FIG. 4(c) shows the intensity of light from the emission spectrum of FIG. 4(a) that is transmitted through the colour filters having the characteristic shown in FIG. 4(b)—that is, FIG. 4(c) shows the result of convolving the emission spectrum of FIG. 4(a) with the filter characteristic of FIG. 4(b). It can be seen, firstly, that the magnitude of the peaks in FIG. 4(c) is very similar to the magnitude of the peaks in the emission spectrum of FIG. 4(a)—that is, very little light at the peak wavelengths of the spectrum of FIG. 4(a) has been absorbed by the colour filters. As a result, the display has a high relative efficiency, and a relative efficiency of around 0.9 may be obtained (where the conventional display of FIG. 2(a) is taken to have a relative efficiency of 1). The efficiency is much greater than a comparative display in which the light source uses conventional phosphors but the display contains narrow colour filters as shown in FIG. 2(b).

A further advantage of the display of this embodiment is that the peaks in the spectrum of FIG. 4(c) are relatively narrow, and show little overlap with one another. This means that the three peaks in FIG. 4(c) lie near to the curved boundary of the colour gamut on the CIE chromaticity diagram. This is shown in FIG. 4(d), in which the triangle defined by the three peaks in FIG. 4(c) is plotted in full lines on the diagram. For comparison, the triangle defined by the prior display of FIG. 2(a) is plotted as dashed lines in FIG. 4(d), and the NTSC triangle is plotted in dotted lines. It can be seen that the triangle defined by the embodiment of FIGS. 4(a)-4(c) has a larger area than the NTSC triangle, and in fact this embodiment can provide an NTSC ratio of around of 114%, as shown in the right hand view of FIG. 2(d). The present invention thus makes it possible to obtain a display having a high NTSC ratio, and also a high relative efficiency (so that a bright display may be obtained).

Figure 5:
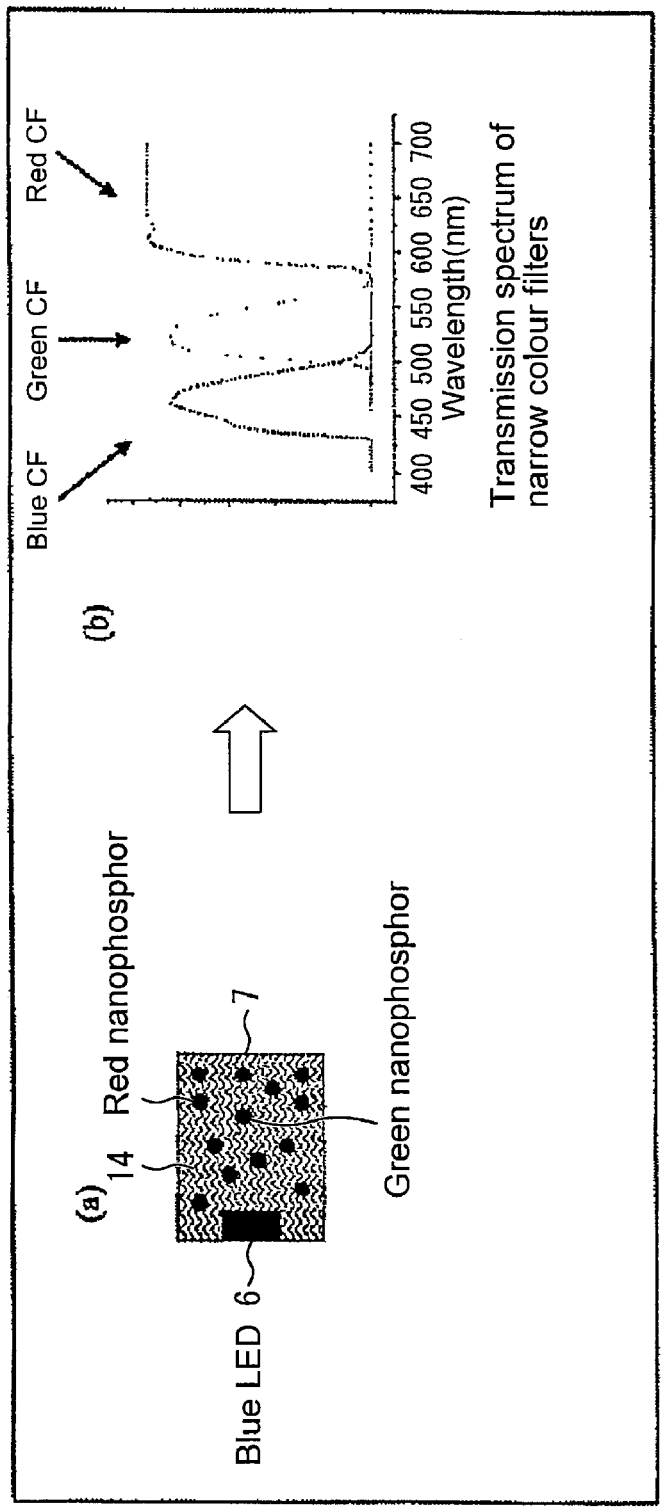
FIG. 5(a) demonstrates a light source for a display of another embodiment of the present invention.
FIG. 5(b) shows transmission spectra of cover filters for the display of the embodiment of FIG. 5(a).

FIG. 5(a) is a schematic illustration of a display according to a further embodiment of the present invention. FIG. 5(a) shows only the light source of the display of this embodiment, and other components of the display are omitted from FIG. 5(a); the display may, for example, have the form shown in FIG. 3.

In this embodiment, the primary light source 6 is a LED that emits in the blue region of the spectrum. The re-emission medium 7 contains a red nanophosphor material and a green nanophosphor material. The light output from the light source therefore contains red light and green light emitted by the red and the green nanophosphors, and blue light from the LED—a portion of the light output from the LED will pass through the nanophosphor materials without being absorbed, and so contributes to the overall output.

In this embodiment, the wavelength range of the blue light from the LED can be tuned to a limited extent by varying the driving conditions of the LED. However, for a given blue LED it is preferable to choose a blue filter having a passband aligned with the emission wavelength of the LED under its preferred driving conditions, to ensure that alignment of the blue light with the blue filter is achieved.

In this embodiment, the display again comprises narrow green, blue and red colour filters having the transmission spectra shown in FIG. 5(b) (which correspond to the spectra shown in FIG. 4(b)). Once again, this display may provide a high NTSC ratio and a high relative efficiency.

In FIG. 5(a), the re-emission material 7 consists of a transparent matrix 14 in which the blend of nanophosphor materials are suspended. The re-emission material 7 is disposed directly over the primary light source 6. However, the light source is not limited to the specific construction shown in FIG. 5(a).

In the above embodiments the re-emission medium 7 contains only nanophosphor materials. The invention is not, however, limited to this and the re-emission material 7 may contain one or more conventional phosphor materials in addition to one or more nanophosphor materials. In particular, one reason why conventional displays may have a low NTSC ratio is that the green point is some way away from the curved boundary of the CIE chromatic diagram. This is illustrated in FIG. 4(d), in which the triangle for a display having conventional red, green and blue phosphors and conventional colour filters (shown in dashed lines) can be seen to have reasonably good red and blue points, as these vertices of the triangle are close to the curved boundary of the colour gamut. However, the green point is some distance from the boundary, and this leads to a low NTSC ratio for this conventional display. It has therefore been found that a display of the present invention may provide good results provided that the re-emission material contains a green nanophosphor material (and the display has narrow green colour filters).

Figure 6:
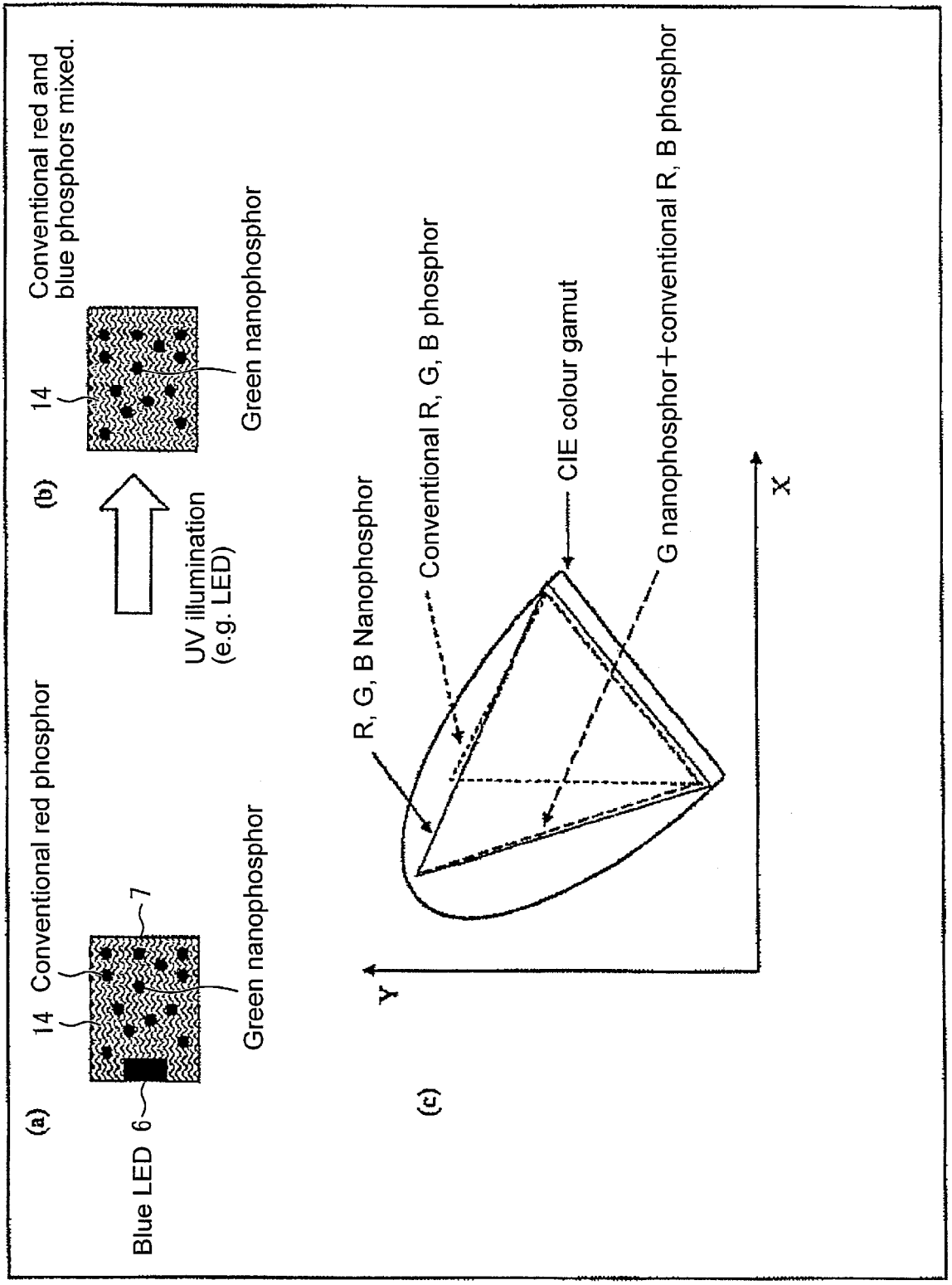
FIG. 6(a) is a schematic illustration of a light source for a display of another embodiment of the present invention.
FIG. 6(b) is a schematic illustration of an alternative light source of this embodiment of the present invention.
FIG. 6(c) shows the display plotted on the CIE chromaticity diagram.

FIG. 6(a) shows a further light source suitable for use in the display 11 of FIG. 3. In this embodiment the primary light source 6 is a blue LED, and the re-emission material 7 contains a green nanophosphor and a conventional red phosphor. A typical output spectrum for the light source is shown in the left hand view of FIG. 2(c)—the resultant emission spectrum contains clearly defined red, green and blue peaks, in contrast to the emission spectrum of FIG. 2(a) or 2(b) in which only conventional phosphors are used.

In the embodiment of FIG. 6(a), the blue light in the output spectrum arises from light from the blue LED 6 that is not absorbed in the re-emission material 7.

FIG. 6(b) shows an alternative light source suitable for use in the display of FIG. 3. In this embodiment, the re-emission material 7 contains a green nanophosphor material and conventional red and blue phosphor material. This re-emission material is intended for illumination by a primary light source that emits light in the ultraviolet region of the spectrum, for example an UV LED (not shown in FIG. 6(b)).

FIG. 6(c) shows the results of an embodiment using the light source of FIG. 6(b) plotted on the CIE chromaticity diagrams in long-dashed lines. The results of the embodiment of FIG. 4(a) are plotted in FIG. 6(c) in full lines, and it can be seen that the two triangles are very close to one another and that both have a much greater area than the triangle obtained using conventional red, green and blue phosphors (shown in short-dashed lines). Use of the light source of FIG. 6(a) or FIG. 6(b) therefore again provides a high NTSC ratio and a good relative efficiency. It should, however, be noted that an embodiment using the light source of FIG. 6(b) is likely to have a slightly lower relative efficiency than the embodiment of FIG. 4(a) as the use conventional red and blue phosphors lead to the output spectrum having a significant intensity at a wavelength of around 575 nm, at which all of the filters have a low transmissivity—so that this light is blocked by the filters and does not contribute to the output of the display.

In the embodiments described above, all the red, green and blue colour filters are narrow colour filters having a narrow passband. The invention is not limited to this, however, and the invention may be implemented by using just one set of colour filters that are narrow passband filters, and using conventional wide band filters for the other filters. In particular, since the main challenge in obtaining a high NTSC ratio is to obtain a good green point on the CIE diagram, the invention may be effected by using narrow passband green colour filters and using wide passband red and blue colour filters. This embodiment is illustrated schematically in FIG. 7(a), which shows the transmission spectra of colour filters of such an embodiment. As can be seen, the green colour filter is a narrow passband colour filter, but the red and blue colour filters are both conventional wideband colour filters.

Figure 7:
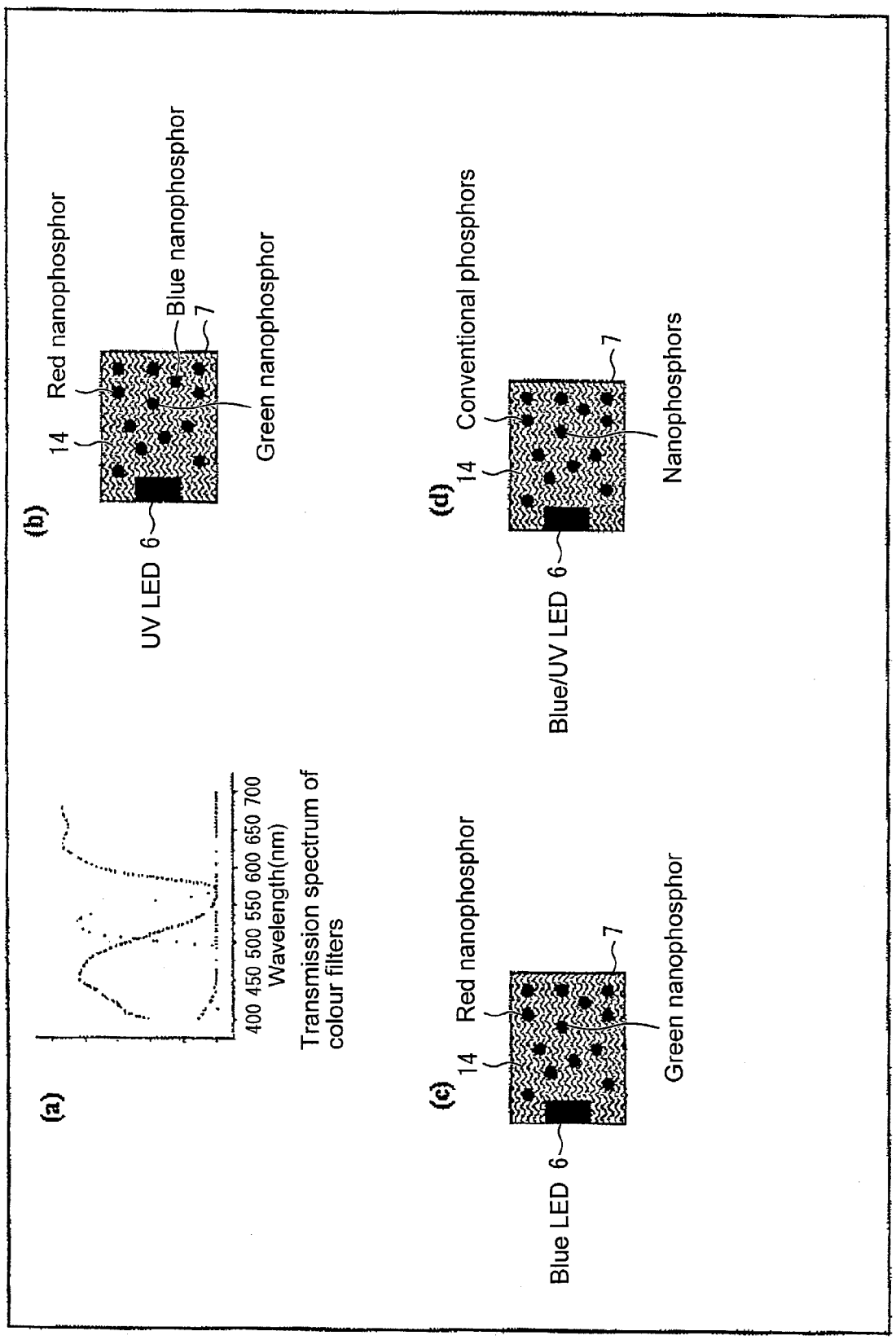
FIG. 7(a) shows transmission spectra of colour filters for a display according to a further embodiment of the present invention.
FIG. 7(b) to 7(d) show possible light sources for this embodiment of the invention.

FIGS. 7(b) to 7(d) illustrate possible light sources suitable for a display of this embodiment. FIG. 7(b) shows a light source in which the re-emission material 7 contains red, green and blue nanophosphors, and the primary light source emits light in the ultraviolet region of the spectrum, and this corresponds to the light source of FIG. 4(a). The light source of FIG. 7(c) corresponds to the light source shown in FIG. 5(a), in which the primary light source emits blue light and the re-emission material contains red and green nanophosphors. In the light source of FIG. 7(d), the re-emission material contains a mixture of nanophosphor materials and the conventional phosphor materials, and the primary light source emits in the blue or UV regions of the spectrum. The light source of FIG. 7(d) may, for example, be a light source as shown in FIG. 6(a) comprising a blue LED and a re-emission material containing a green nanophosphor and a conventional red phosphor, or it may for example be a light source as shown in FIG. 6(d) in which the primary light source 6 emits in the UV region of the spectrum and the re-emission material contains a green nanophosphor material and red and blue conventional phosphors.

An embodiment using a narrow passband green filter and conventional wideband red and blue colour filters, as in FIG. 7(a), is summarised in FIG. 2(e). As can be seen, a display of this embodiment may again provide a high NTSC ratio of over 110%, and a high relative efficiency. A high NTSC ratio may be obtained as the effect of using wideband red and blue colour filters is minimal on the coordinates of the red and blue points on the CIE colour diagram. The use of wideband red and blue colour filters is also effective to reduce the amount of light blocked by the filters, thereby improving the relative efficiency of the display.

Figure 8:
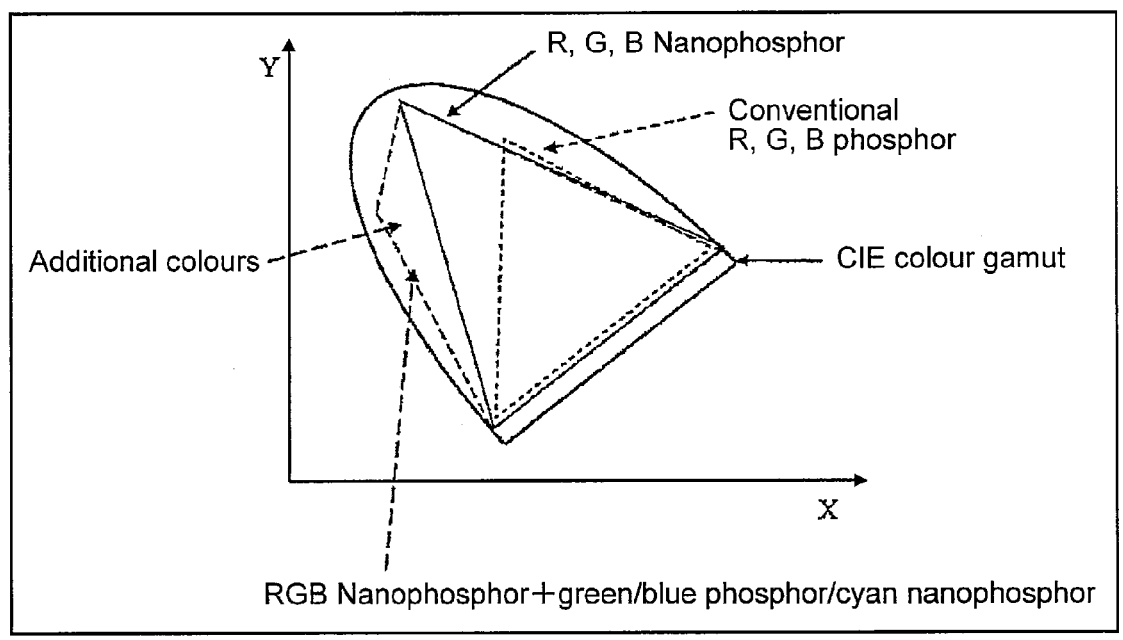
FIG. 8 shows a display according to a further embodiment of the present invention plotted on the CIE chromaticity diagram.

In the embodiments described above, the output spectrum of the light source has contained three emission peaks, one in each of the red, green and blue regions of the spectrum. The displays described so far therefore correspond to a triangle on the CIE chromaticity diagram. In a further embodiment of the present invention, it is possible to add further nanophosphors to the re-emission material, so that the display is represented by a quadrilateral (if one further nanophosphor is added) or by a higher order figure (if two or more nanophosphors are added), rather than a triangle, on the CIE chromaticity diagram. For example, it would be possible to add a green/blue (cyan) phosphor or nanophosphor into the re-emission material of any of the embodiments described above, so that the output spectrum of the light source contained a cyan peak in addition to the red, green and blue peaks. The effect of this is shown in FIG. 8; the quadrilateral shown in long-dashed shape in FIG. 8 represent a display in which the re-emission material contains a cyan nanophosphor (two sides this shape are coincident with the triangle shown in full lines, corresponding to an embodiment in which red, green and blue nanophosphors are used). It can be seen that the use of the additional cyan nanophosphor has extended the colour gamut of the display into the blue/green region, and has provided a further increase in NTSC ratio.

It should be noted that, where one further nanophosphor is added, the further nanophosphor is not limited to a cyan nanophosphor. Where a further nanophosphor is added, the further nanophosphor may, for example, alternatively be a yellow nanophosphor or a magenta nanophosphor.

In an embodiment in which a further phosphor or nanophosphor is provided, the existing three red, green and blue nanophosphors/phosphors may be adapted so as to maximise the gamut coverage.

In principle, more than one further nanophosphor or phosphor could be added to the re-emission material 7. Addition of two further nanophosphors/phosphors would lead to a display represented by a five-sided figure in the CIE chromaticity diagram, and so on.

It should be noted that the full advantages of an embodiment containing one or more further phosphors or nanophosphors cannot be obtained if a conventional RGB image display panel is used. To take maximum advantage of this embodiment, the image display panel would require one or more further sets of pixels having filters whose transmission/absorption band(s) is/are aligned with the emission wavelength of the one or more further phosphors or nanophosphors. Thus, in an example where cyan nanophosphors are provided in addition to red, green and blue nanophosphors, the image display panel would preferably have a further set of pixels having cyan filters in addition to red, green and blue sets of pixels, since the cyan light would be heavily absorbed by the red, green and blue colour filters of a conventional RGB image panel—in this example, the provision of cyan pixels will lead to greater brightness for the display. Similarly, if yellow or magenta nanophosphors were provided in addition to red, green and blue nanophosphors, the image display panel would preferably have a further set of pixels having yellow or magenta filters.

Figure 9:
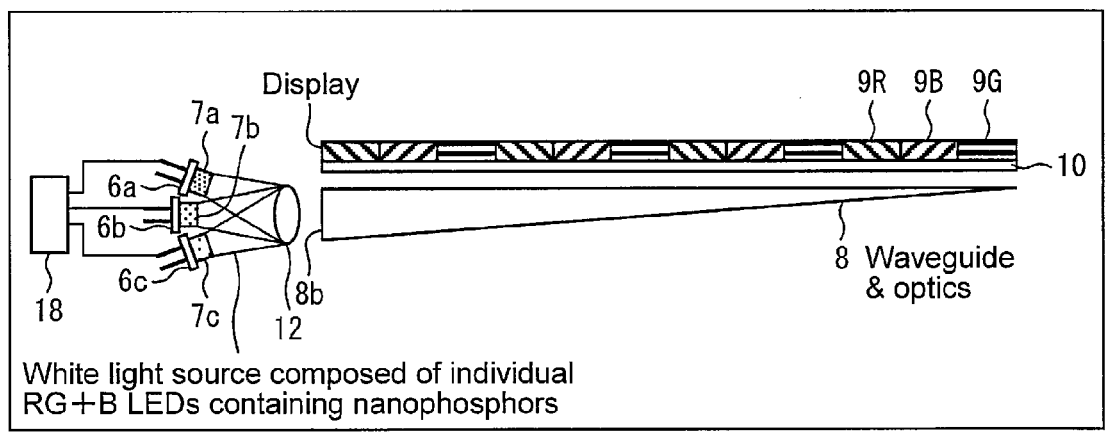
FIG. 9 is a schematic sectional view of a display according to a further embodiment of the present invention.

In the embodiments described above, the light source comprises a primary light source that illuminates a re-emission medium, with the output from the re-emission medium being coupled into the waveguide 8. The invention is not limited to this, however, and in principle the light source could comprise a plurality of re-emission materials, each illuminated by a separate primary light source. An example of a display according to this embodiment of the invention is shown in FIG. 9. In this embodiment, the light source contains three separate re-emission materials 7a, 7b, 7c, each of which is illuminated by a separate primary light source 6a, 6b, 6c. At least one of the re-emission materials 7a, 7b, 7c is a nanophosphor material. If, for example, the re-emission materials 7a, 7b and 7c respectively comprise a red nanophosphor material, a blue nanophosphor material and a green nanophosphor material, the light source will provide substantially the same overall output as the light source of FIG. 4(a). As a further example, if one of the emission materials comprises a green nanophosphor and the others comprise conventional red and blue phosphors, the light source of this embodiment may have the same output spectrum as the light source of FIG. 6(b).

The primary light sources 6a, 6b, 6c may be, for example, blue or ultraviolet LEDs, depending on the particular materials used for the re-emission materials 7a, 7b, 7c.

The light from each of the re-emission materials 7a, 7b, 7c are combined by a suitable optical system 12, that directs the light onto the input face 8b of the waveguide 8.

The image display panel 2 of the display of FIG. 9 is similar to the image display panel of FIG. 3, and its description will not be repeated.

In this embodiment, the chromaticity of the white light overall output from the light source can be varied by altering the brightness of one primary light source relative to the brightness of the other primary light sources. To effect this, a suitable control means 18 that drives the primary light sources 6a, 6b, 6c independently of one another may be provided, as schematically shown in FIG. 9. As an example, if the chromaticity of the white light output from the light source changes as a result of degradation of one of primary light sources 6a, 6b, 6c, the control means 18 may increase the power output of the primary light source that has degraded, to restore the chromaticity of the white light output to its desired value.

In the embodiments described above, the re-emission material 7 may consist of a transparent matrix 14 in which the nanophosphor material(s) and any conventional phosphor materials are suspended. This is shown schematically in, for example FIG. 5(a). This is also the case for the re-emission materials 7a, 7b and 7c of the embodiment of FIG. 9.

Figure 4:
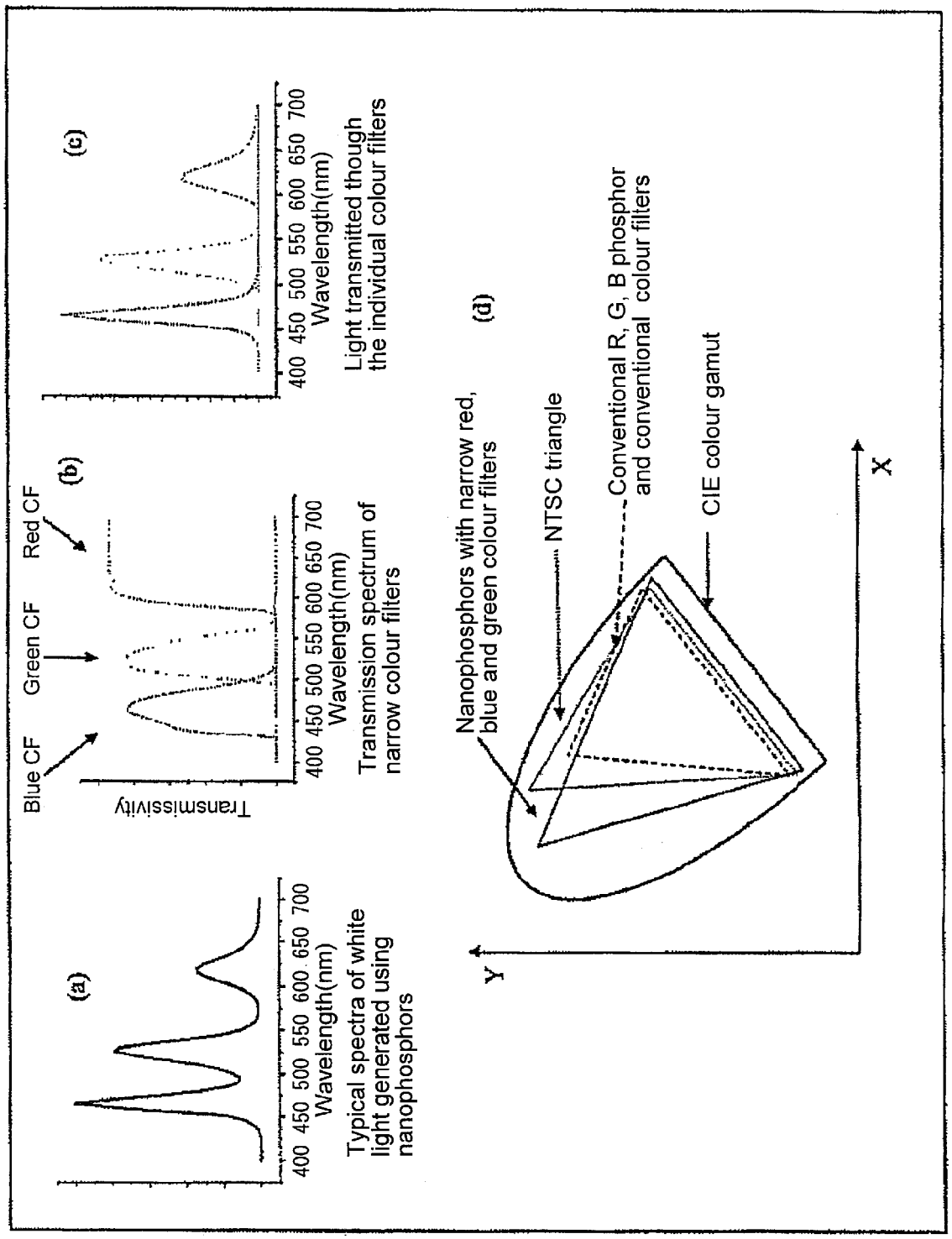
FIG. 4(a) shows a backlight spectrum for a display according to an embodiment of the present invention.
FIG. 4(b) shows transmission spectra of colour filters of a display according to the present invention.
FIG. 4(c) shows the transmission of light from the backlight of FIG. 4(a) through the colour filters of FIG. 4(b).
FIG. 4(d) shows the results of FIG. 4(c) plotted on the CIE chromaticity diagram.

The re-emission material 7, 7a, 7b, 7c may be disposed directly over the (respective) primary light source 6, 6a, 6b, 6c as shown schematically in, for example, FIG. 5(a). Alternatively, the re-emission material may be spaced from the (respective) primary light source, as indicated in FIG. 4 or FIG. 6(b). This reduces the heatload on the re-emission material.

Figure 10:
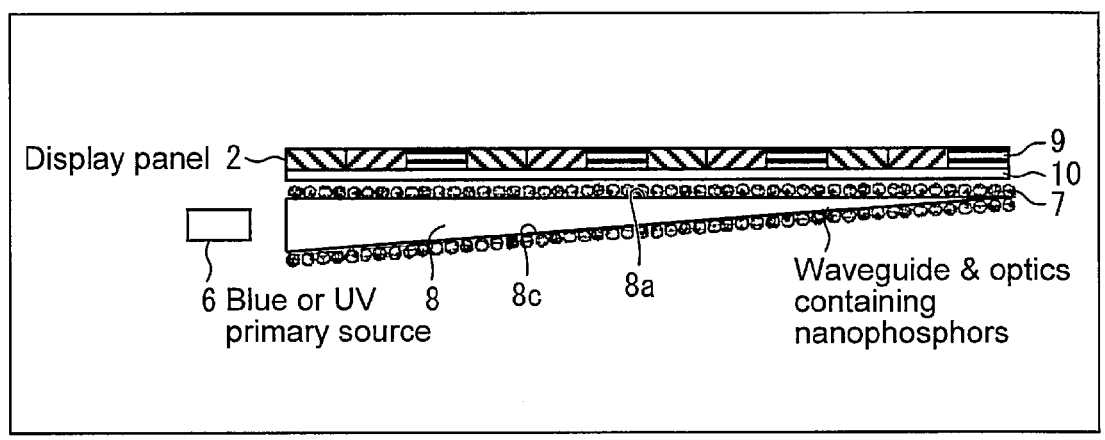
FIG. 10 is a schematic illustration of a display according to a further embodiment of the present invention.

In the embodiments described above, the re-emission material 7, 7a, 7b, 7c has been disposed on the primary light source 6, 6a, 6b, 6c, or between the primary light source 6, 6a, 6b, 6c and the entrance face 8b of the waveguide 8. The invention is not, however, limited to this, and it is only necessary that the re-emission material 7 is disposed between the primary light source 6 and the image display panel 2. FIG. 10 shows a further embodiment of the present invention, in which the re-emission material 7 is provided on the exit face 8a of the waveguide, and also on the surface 8c of the waveguide opposed to the exit surface 8a. In this embodiment, light from the primary light source 6, which may be a blue light source or an UV light source, is coupled into and propagates within the waveguide and is eventually incident on either the light-emission face 8a or the opposing face 8c of the waveguide, at which point it is absorbed by the re-emission material 7. Light re-emitted by the re-emission material 7 is emitted from the exit surface 8a of the waveguide and then passes through the image display panel 2.

Figure 11:
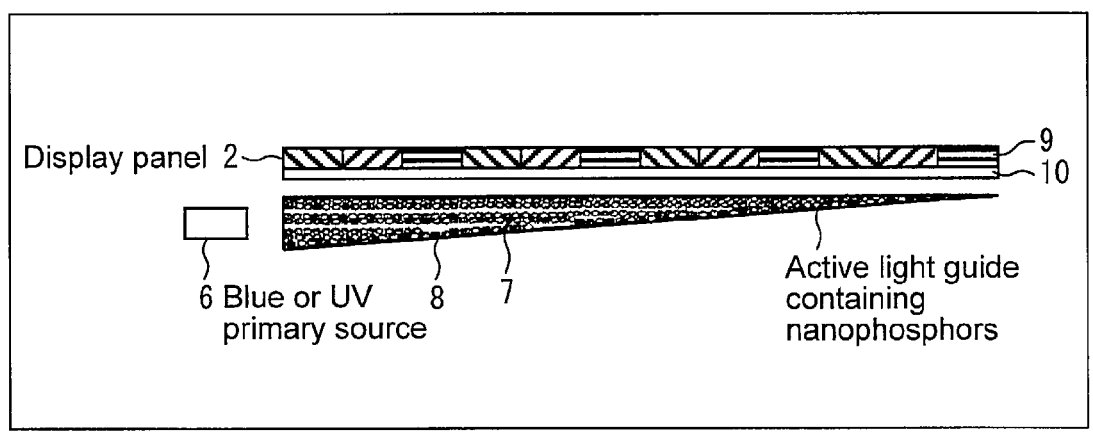
FIG. 11 is a schematic sectional view of a display according to a further embodiment of the present invention.

In a further embodiment, the re-emission material 7 is contained within the body of the waveguide 8, as shown in FIG. 11. The nanophosphors and any conventional phosphors may, for example, be disposed in a suitable transparent matrix, such as a transparent resin which is moulded to the desired shape of the waveguide and then cured. It is necessary to ensure that all the nanophosphors and any conventional phosphors are dispersed over the entire volume of the waveguide, to ensure that white light is obtained over the entire area of the output face of the waveguide.

In the embodiments of FIGS. 10 and 11, the re-emission material 7 is remote from the primary light source 6, so that heat generation within the re-emission material 7 is reduced and the lifetime of the re-emission material is increased. Moreover, the re-emission material will itself act as a diffuser, so that light from the re-emission material 7 will be distributed over the area of the display panel 2 with substantially uniform intensity. In contrast, in the embodiment of, for example, FIG. 3, it may be necessary to provide a diffuser (not shown) between the output face 8a of the waveguide and the image display panel 2 in order to ensure that the display panel is illuminated by light having a substantially uniform intensity over the area of the display panel.

Figure 12:
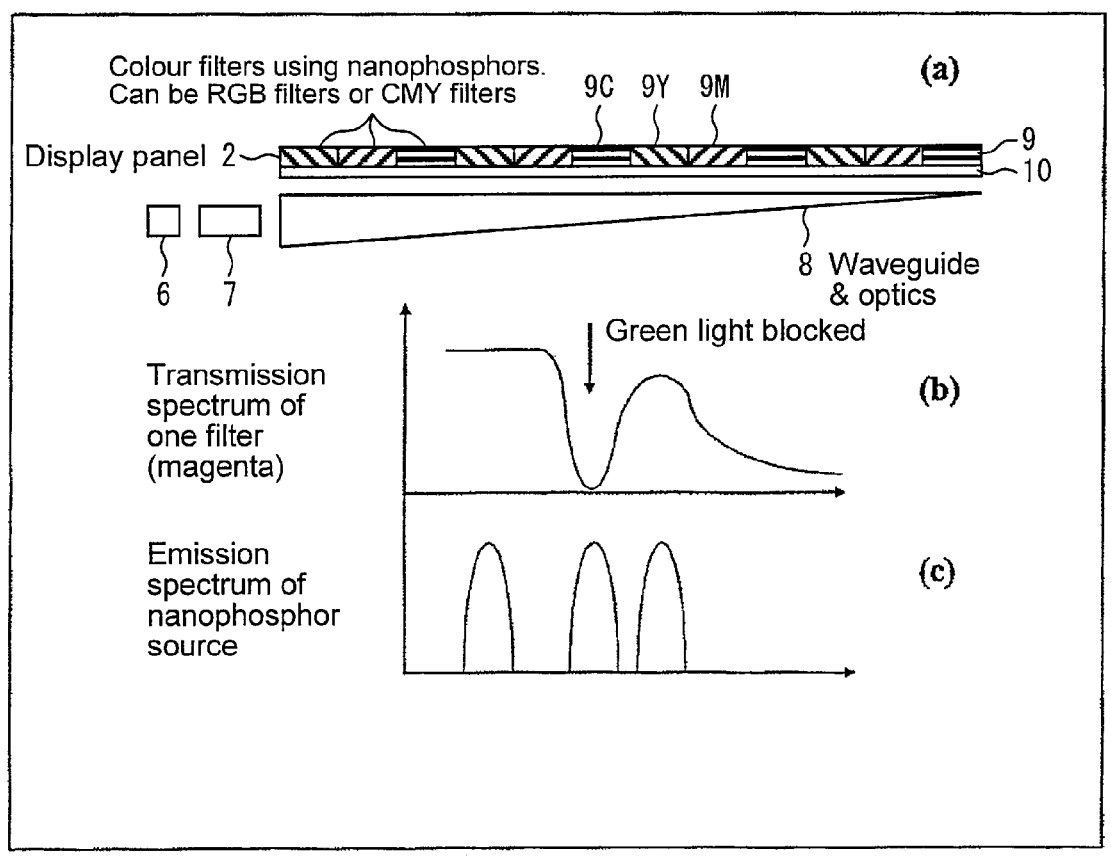
FIG. 12(a) is a schematic sectional view of a display according to a further embodiment of the present invention.
FIG. 12(b) shows the transmission section of one filter of the display of the embodiment of FIG. 12(a).
FIG. 12(c) shows the emission spectrum of the light source of the display of the embodiment of FIG. 12(a).

In the embodiments described above, the colour filters 9 in the image display panel have a transmission window that is aligned with one of the peaks in the emission spectrum of the light source, so that light corresponding to this peak of the emission spectrum is transmitted by the colour filter and light corresponding to the other peaks of the emission spectrum is blocked. In an alternative embodiment of the invention, the filters 9 of the image display panel 2 have a narrow absorption band, and transmit light at all wavelengths outside the absorption band. This is illustrated in FIG. 12(b), which shows the transmission spectrum of a filter that has a narrow absorption band in the green region of the spectrum, but that transmits red and blue light. This filter therefore acts as a magenta filter since, when illuminated by white light, it will transmit magenta (red-blue) light. In this embodiment, the colour filters 9 of the display include a set of cyan filters 9C, a set of magenta filters 9M, and a set of yellow filters 9Y as indicated in FIG. 12(a), which is a sectional view of the display. The cyan filters have a narrow absorption band in the red spectrum region, and transmit green and blue light, whereas the yellow filters 9Y block blue light and transmit red and green light. In this embodiment, the green absorption band of the magenta filter is aligned with the green emission peak in the output spectrum of the light source (the output spectrum of the light source is shown in FIG. 12(c)), so that the green absorption band is centred or substantially centred on the wavelength at which the green peak in the output spectrum of the light source has maximum intensity. Similarly, the cyan filter has its red absorption region aligned with the red peak in the output spectrum from the light source, and the yellow filter has its blue absorption region aligned with the blue peak in the output spectrum of the light source.

At least one of the filters has a narrow absorption band, preferably with a FWHM of less than 100 nm. In a particularly preferred embodiment, the yellow, cyan and magenta filters may each have a narrow absorption band, preferably with a FWHM of 100 nm or less. (The filters are not required to have the same FWHM as one another, although they may all have substantially the same FWHM as one another.)

In a display of this embodiment, each filter 9C, 9Y, 9M blocks only one peak of the output spectrum of the light source, whereas a filter in a RGB display blocks two peaks in the output spectrum of the light source. A display using cyan, magenta and yellow filters can therefore provide greater brightness than a RGB display. Moreover, the contrast of a cyan-magenta-yellow display may be greater than the contrast of a comparable RGB display.

In the embodiment of FIGS. 12(a) to 12(c), the colour filters 9C, 9Y, 9M may incorporate nanophosphors. Nanophosphors have a transmission spectrum that has a strong absorption line and, by tuning the nanophosphor such that the absorption band corresponds with a peak in the emission spectrum of the light source, it is possible to obtain a narrow band cyan, magenta or yellow filter.

In this embodiment, nanophosphors may be directly deposited, for example onto a transparent substrate of the image display device to form a narrow band cyan, magenta or yellow filter, using a solvent which can be evaporated or otherwise removed after deposition of the nanophosphors. Alternatively, nanophosphors may be disposed within a transparent matrix such as spin-on-glass, resins, gels, silicones etc.

The red, green and blue filters of embodiments relating to a red-green-blue display may also be made using nanophosphors. For example, a narrow passband green filter could be made using two nanophosphor materials, one having an absorption band in the red spectral region and one having an absorption band in the blue region of the spectrum. Again, the nanophosphors may be directly deposited using a solvent onto a transparent substrate or they may be disposed within a transparent matrix.

The invention has been described above with reference to full colour displays, in particular to RGB displays or CYM displays. In principle, however, the invention may be applied to displays that are not full colour displays, for examples displays intended to provide airport departure information where only a limited range of colours of needed, and such displays may have a light source with an emission spectrum having only two peaks. In such cases, the light source may comprise a re-emission material that, when illuminated by light from a primary light source, emits light in first and second wavelength bands. Alternatively, the light source may comprise a re-emission material that, when illuminated by light from a primary light source, emits light in a first wavelength band, with part of the light from the primary light source passing through the re-emission medium without absorption and providing the second component of the emission spectrum. By using at least one nanophosphor in the re-emission material of the light source, it is possible to tune the respective emission wavelength to minimise absorption in the corresponding filter.

In embodiments of the invention in which the re-emission material comprises two or more nanophosphors, the nanophosphors may be of different types. For example, a red nanophosphor may comprise InGaP quantum dots whereas a green nanophosphor may comprise InGaN quantum dots. Alternatively, it may be possible to use a single material system to provide two or more nanophosphors—for example, it is possible to vary the wavelength of light re-emitted from, for example, InGaN quantum dots by varying the In concentration in the InGaN, and/or by varying the size of the quantum dots.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A display comprising: a light source and an image display panel disposed in an optical path from the light source;
   wherein the light source comprises a primary light source for emitting light in a primary wavelength range and a re-emission material for, when illuminated by light from the primary light source, re-emitting light in a wavelength range different from the primary wavelength range;
   wherein the re-emission material comprises at least a first nanophosphor material for, when illuminated by light from the primary light source, re-emitting light in a first wavelength range different from the primary wavelength range;
   and wherein the image display panel comprises a first filter having a first narrow passband or a first narrow absorption band, the first narrow passband or first narrow absorption band being aligned or substantially aligned with the first wavelength;
   and wherein the first filter is a green filter and the passband or absorption band of the green filter has a full width at half maximum (FWHM) of 100 nm or less.

2. A display as claimed in claim 1 wherein the re-emission material comprises a second nanophosphor material for, when illuminated by light from the primary light source, re-emitting light in a second wavelength range different from the primary wavelength range and different from the first wavelength range.

3. A display as claimed in claim 2 wherein the image display panel comprises a second filter having a second narrow passband or a second narrow absorption band, the second narrow passband or second narrow absorption band being aligned or substantially aligned with the second wavelength range.

4. A display as claimed in claim 3 wherein the image display panel comprises a third filter having a third narrow passband or a third narrow absorption band, the third narrow passband or third narrow absorption band covering a third wavelength range, the third wavelength range being different from the first wavelength range and different from the second wavelength range.

5. A display as claimed in claim 1 wherein the re-emission material comprises a third nanophosphor material for, when illuminated by light from the primary light source, re-emitting light in a third wavelength range different from the primary wavelength range, different from the first wavelength range and different from the second wavelength range.

6. A display as claimed in claim 5 wherein the third wavelength range is in the red portion of the visible spectrum.

7. A display as claimed in claim 5 wherein the image display panel comprises a third filter having a third narrow passband or a third narrow absorption band, the third narrow passband or third narrow absorption band being aligned or substantially aligned with the third wavelength range.

8. A display as claimed in claim 7 wherein the first filter has a first narrow absorption band aligned or substantially aligned with the first wavelength range, the second and third wavelength ranges not being aligned with the first narrow absorption band.

9. A display as claimed in claim 8 wherein the second filter has a second narrow absorption band aligned or substantially aligned with the second wavelength range, the first and third wavelength ranges not being aligned with the second narrow absorption band.

10. A display as claimed in claim 9 wherein the third filter has a third narrow absorption band aligned or substantially aligned with the third wavelength range, the first and second wavelength ranges not being aligned with the third narrow absorption band.

11. A display as claimed in claim 7, wherein the re-emission material further comprises a fourth nanophosphor material for, when illuminated by light from the primary light source, re-emitting light in a fourth wavelength range, the fourth wavelength range being different from the first wavelength range, different from the second wavelength range, and different from the third wavelength range.

12. A display as claimed in claim 11, wherein the image display panel comprises a fourth filter having a fourth narrow passband or a fourth narrow absorption band, the fourth narrow passband or fourth narrow absorption band being aligned or substantially aligned with the fourth wavelength range.

13. A display as claimed in claim 11 wherein the first filter comprises a fifth nanophosphor material.

14. A display as claimed in claim 7, wherein the second filter comprises a sixth nanophosphor material and the third filter comprises a seventh nanophosphor material.

15. A display as claimed in claim 1 wherein the first wavelength range is in the green portion of the visible spectrum, wherein the second wavelength range is in the red portion of the visible spectrum, and wherein the primary wavelength range is in the blue region of the visible spectrum.

16. A display as claimed in claim 1 wherein the image display panel comprises a second filter and a third filter, the second filter having a second narrow passband or a second narrow absorption band, the second narrow passband or second narrow absorption band covering a second wavelength range, the third filter having a third narrow passband or a third narrow absorption band, the third narrow passband or third narrow absorption band covering a third wavelength range; wherein, the second wavelength range is different from the first wavelength range, and wherein the third wavelength range is different from the first wavelength range and different from the second wavelength range.

17. A display as claimed in claim 1 wherein the first wavelength range is in the green portion of the visible spectrum.

18. A display as claimed in claim 1 and comprising a waveguide for receiving light from the primary light source.

19. A display as claimed in claim 18 wherein the or each nanophosphor material is disposed on a light-emission face of the waveguide.

20. A display as claimed in claim 19 wherein the light source further comprises a third primary light source and a third nanophosphor material arranged to be illuminated by light from the third primary light source, for, when illuminated by light from the third primary light source, re-emitting light in a third wavelength range different from the first wavelength range and different from the second wavelength range.

21. A display as claimed in claim 18 wherein the or each nanophosphor material is disposed within the waveguide.

22. A display as claimed in claim 1 wherein the light source comprises a first primary light source and a second primary light source; wherein the first nanophosphor material is arranged to be illuminated by light from the first primary light source; and wherein the light source further comprises a second nanophosphor material arranged to be illuminated by light from the second primary light source, for, when illuminated by light from the second primary light source, re-emitting light in a second wavelength range different from the first wavelength range.

23. A display as claimed in claim 22 and comprising a controller for driving the primary light sources independently of one another.

24. A display as claimed in claim 1 wherein the second wavelength range is in the blue portion of the visible spectrum.

25. A display as claimed in claim 1 wherein the primary wavelength range is within an ultra-violet wavelength range.

26. A display as claimed in claim 1 wherein the first nanophosphor material contains nanoparticles selected from the group consisting of: colloidal quantum dots, nanorods, nanoneedles, nanospindles, fullerenes, nanowires and dendrimers.

27. A display as claimed in claim 1 wherein the passband or absorption band of the first filter has a full width at half maximum (FWHM) of 80 nm or less.

28. A display as claimed in claim 1 wherein the first nanophosphor material has a full width at half maximum (FWHM) of 80 nm or less.

29. A display as claimed in claim 28 wherein the first nanophosphor material has a full width at half maximum (FWHM) of 60 nm or less.

30. A display as claimed in claim 1 wherein the first nanophosphor material contains nanoparticles having a size of less than 200 nm.

31. A display as claimed in claim 30 wherein the first nanophosphor material contains nanoparticles having a size of greater than 1 nm.

* * * * *